(12) United States Patent
Savic et al.

(10) Patent No.: US 7,024,360 B2
(45) Date of Patent: Apr. 4, 2006

(54) SYSTEM FOR RECONSTRUCTION OF SYMBOLS IN A SEQUENCE

(75) Inventors: Michael Savic, Ballston Lake, NY (US); Michael Moore, Alplaus, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 414 days.

(21) Appl. No.: 10/390,096

(22) Filed: Mar. 17, 2003

(65) Prior Publication Data

US 2004/0186717 A1   Sep. 23, 2004

(51) Int. Cl.
*G10L 15/14* (2006.01)

(52) U.S. Cl. .................... 704/256; 704/256.4
(58) Field of Classification Search ............. 704/255, 704/256–256.8
See application file for complete search history.

(56) References Cited

U.S. PATENT DOCUMENTS

| | | | | |
|---|---|---|---|---|
| 4,783,804 A | * | 11/1988 | Juang et al. | 704/245 |
| 5,710,866 A | * | 1/1998 | Alleva et al. | 704/256.4 |
| 5,806,030 A | * | 9/1998 | Junqua | 704/245 |
| 5,999,893 A | * | 12/1999 | Lynch et al. | 702/181 |
| 6,052,682 A | * | 4/2000 | Miller et al. | 707/3 |
| 6,058,365 A | * | 5/2000 | Nagai et al. | 704/257 |
| 6,092,042 A | * | 7/2000 | Iso | 704/240 |
| 6,112,021 A | * | 8/2000 | Brand | 703/2 |
| 6,208,964 B1 | * | 3/2001 | Sabourin | 704/244 |
| 6,285,786 B1 | * | 9/2001 | Seni et al. | 382/187 |
| 6,848,080 B1 | * | 1/2005 | Lee et al. | 715/533 |

* cited by examiner

*Primary Examiner*—Vijay Chawan
*Assistant Examiner*—Michael N. Opsasnick
(74) *Attorney, Agent, or Firm*—Notaro & Michalos PC

(57) ABSTRACT

A method of reconstructing a damaged sequence of symbols where some symbols are missing is provided in which statistical parameters of the sequence are used with confidence windowing techniques to quickly and efficiently reconstruct the damaged sequence to its original form. Confidence windowing techniques are provided that are equivalent to generalized hidden semi-Markov models but which are more easily used to determine the most likely missing symbol at a given point in the damaged sequence being reconstructed. The method can be used to reconstruct communications consisting of speech, music, digital transmission symbols and others having a bounded symbol set which can be described by statistical behaviors in the symbol stream.

15 Claims, 11 Drawing Sheets

CIRCULAR ROTATE LEFT →

CIRCULAR ROTATE LEFT →

REVERSE →

NO CHANGE →

SYSTEM FOR RECONSTRUCTION OF SYMBOLS IN A SEQUENCE

STATEMENT OF POSSIBLE GOVERNMENT INTEREST

This invention was developed in part with funding under U.S. Air Force project no. F30602-00-1-0527, and the United States government may have an interest in this invention.

FIELD AND BACKGROUND OF THE INVENTION

The present invention relates generally to the field of symbol reconstruction and in particular to a new and useful method for accurately reconstructing missing portions of a sequence of symbols. The invention is particularly useful for reconstructing portions of oral conversations which are made unintelligible to a listener by surrounding ambient noise, and sudden, loud "staccato" noise, among other noise sources.

Most forms of communication rely upon transmission of groups of discrete elements arranged in a manner which is understood by both the transmitting and a receiving party. Accurate communication between the transmitter and a receiver depends on the message formed by the groups of discrete elements, or symbols, being transmitted uncorrupted and intact between the two parties.

Corrupted streams of symbols or discrete elements which comprise a communications system having a known structure and probabilities can sometimes still accurately convey a message to a person capable of reconstructing the stream without the corruption. That is, the communication system has known characteristics, or language parameters. For example, when a non-native speaker of a language attempts to say something to a native speaker, the native speaker can often determine the meaning even though the message is not spoken the same way as the native speaker would because the native speaker can apply known language parameters. Similarly, when two persons communicating in the same language over a telephone have their conversation interrupted by noises, their knowledge of the language parameters of their speech sometimes allows them to "fill in" or reconstruct missing sections of the conversation and understand the intended message despite the corrupting noises.

Confidence windowing is the basis for many known reconstruction methods and employs the probability of unknown phonemes conditioned on its relationship with other symbols in the same communication stream. Confidence windows are discussed in greater detail in Christopher W. Scoville, *Spatially Dependent Probabilistic Events*. Master's Thesis, RPI, Troy, N.Y. 1998.

However, many times when a communication is corrupted, or damaged, by external noises, the message cannot be easily ascertained, even when both parties know the general language of communication or when other symbols in the communication are known. For example, if the outdoor performance of a symphony playing a new composition for an audience is corrupted by external noises like wind, traffic, etc., the audience will not likely be able to accurately determine what specific notes should have been heard. And, as well, when a communication is transmitted for reception by a large group of receivers, like a group of attendees at a seminar, some of the receivers of a corrupted portion of the communication may be able to reconstruct the intended message, while others cannot. This is due in part to a lack of knowledge of language rules that can be applied to the communication in these instances.

Many types of communication require accurate transmission and reception of uncorrupted messages. Computer voice recognition, for example, relies upon accurate speech communications from a person using the voice recognition. External interference with the transmission of a voice command to a computer can corrupt the command and result in no action or the wrong action being taken because the voice recognition capability cannot accurately reconstruct the command. That is, reconstruction is different from recognition in that it is a further step beyond recognition.

There are many other instances where it is advantageous to be able to reconstruct a corrupted message quickly and accurately. Speech reconstruction in particular is of great interest and has a wide range of applications, including interaction or communication with a computerized entity, law enforcement interception of communications relating to illegal activities, and assistance to persons with deficient hearing.

Different prior methods for recognizing sequences of symbols, such as speech recognition, are found in the prior art. As shown by its prevalence of use in modeling speech for recognition, hidden Markov models (HMMs) are a preferred modeling tool for this application.

Several patents disclose word recognition using hidden Markov models (HMM), including U.S. Pat. No. 5,608,840, which discloses a method and apparatus for pattern recognition using a hidden Markov model. HMMs are developed from signal samples for use in the recognition system. The HMM equations are weighted to reflect different state transition probabilities.

U.S. Pat. No. 5,794,198 teaches a speech recognition technique which reduces the necessary number of HMM parameters by tying similar parameters of distributions in each dimension across different HMMs or states.

Other patents disclosing speech recognition using HMMs include U.S. Pat. No. 5,822,731, U.S. Pat. No. 5,903,865 and U.S. Pat. No. 5,937,384. However, none of these three or the other patents teaching speech recognition disclose speech reconstruction. If a portion of received speech is not recognizable, the prior systems cannot determine the missing speech.

The ability to extrapolate and accurately replace missing pieces from a stream of symbols is what distinguishes reconstruction from recognition. Recognition assumes perfect or near-perfect communications, with no missing pieces. Recognition is effectively a conversion of a complete, uncorrupted communication from one media to another, such as voice to computer text. Reconstruction may include recognition for determining surrounding states, but is a further step beyond recognition. Reconstruction is a process of determining missing pieces of a communication and replacing those missing pieces with the correct piece, or symbol in the communication.

Hidden Markov models have been used by researchers in many speech processing applications such as automatic speech recognition, speaker verification, and language identification. An HMM is a doubly stochastic process where the underlying stochastic process for the model, usually described by a stochastic finite-state automaton, is not directly observable. The underlying stochastic process is only observed through a sequence of observed symbols, hence the term "hidden" Markov model.

A characteristic of the HMM is that the probability of time spent in a particular state, called "state occupancy", is geometrically distributed. The geometric distribution, however, becomes a serious limitation and results in inaccurate modeling when the HMMs are used for phoneme recognition, which is essential to speech recognition.

The output of an HMM for each discrete time depends on the observation probability distribution of the current state. A discrete observation hidden Markov model, where the number of possible observation symbols is finite, can be completely described by a) the transition probably matrix describing the probability of transition between states of the finite-state automata, b) the observation probability matrix describing the probability distribution of the observation symbols given the current state, and c) the probability of being in a particular state at zero time.

Thus, the HMM output signal for each clock period depends on the observation probability distribution for the current state. With each clock pulse, a state transition is made depending on the state transition probability matrix. If transitions to the same state are allowed, then the state occupancy duration for a particular state is a random variable with a geometric probability distribution.

A semi-Markov model (SMM) is a more general class of Markov chains in which the state occupancy can be explicitly modeled by an arbitrary probability mass distribution. Semi-Markov models avoid the unrealistic implicit modeling of the state occupancy by replacing the underlying strictly Markov chain with a semi-Markov chain to explicitly model the state occupancy. As a result, semi-Markov chains do not necessarily satisfy the Markov property. While the knowledge of the current state is sufficient to determine the future states in a Markov chain, in a semi-Markov chain the future is also dependent on the past up to the last state change. Since the state occupancy durations are explicitly modeled, transition to the same state is not allowed. Although the semi-Markov model does not satisfy the strict Markov property, it retains enough of the main properties of the Markov chains.

Thus, there are drawbacks to using both HMMs and SMMs when reconstructing sequences of symbols, such as phonemes in a spoken communication.

A modification of the hidden Markov model, called a hidden semi-Markov model (HSMM) provides increased modeling accuracy over both SMMs and HMMs. The complete formulation of the HSMM and its training algorithms allow the HSMM to be used for any application currently modeled by an HMM by making appropriate modifications. Algorithms such as forward-backward procedure, Baum-Welch reestimation formula and Viterbi Algorithm can all be modified for use with an HSMM.

It should be noted that hidden semi-Markov models are different from hidden Markov models. HSMMs add a computational layer of complexity over HMMs which can increase the time to solve the equations and provide results.

Techniques have been developed at Rennselaer Polytechnic Institute to decrease the computation load while maintaining the desirable modeling characteristics of HSMMs. See, N. Ratnayake, "Phoneme Recognition Using a New Version of the Hidden Markov Model". PhD Thesis, RPI, Troy, N.Y. 1992. Although these techniques are useful, further simplification while maintaining the accuracy of the HSMM is needed to improve it as a symbol sequence reconstruction method.

A method and system for reconstructing sequences of symbols using language parameters and a statistical assessment of the effects of known symbols on unknown symbols, are needed to improve symbol sequence reconstruction accuracy.

SUMMARY OF THE INVENTION

It is an object of the present invention to provide a new method and system using statistical analysis to reconstruct a sequence of symbols that is missing parts of the sequence.

It is a further object of the invention to provide a method of approximating confidence windowing techniques using hidden semi-Markov models and generalized hidden semi-Markov models to reconstruct a symbol sequence having missing symbols in a communications system having known parameters.

Yet another object of the invention is to provide a method for speech reconstruction by statistical analysis of the known speech in a stream of speech being reconstructed, without excessive memory or computational requirements for operation.

A further object of the invention is to provide a speech reconstruction method and system which can regularly produce greater than 80% accurate results.

Accordingly, a system and method of reconstructing a damaged sequence of symbols where some symbols are missing are provided in which statistical parameters of the sequence are used to approximate confidence windowing techniques to quickly and efficiently reconstruct the damaged sequence to its original form. Confidence windowing is a higher order calculation using the probabilities related to inter-symbol influence of known symbols in a stream of symbols upon the unknown symbols in the same stream.

In a first embodiment, a hidden semi-Markov model (HSMM) is used to approximate the confidence windowing technique. HSMMs are used to reconstructing a missing symbol in a stream of speech by considering the immediately prior and post states and state duration.

In a second embodiment, a generalized hidden semi-Markov model (GHSMM) is provided, which not only introduces greater accuracy through language parameters, but also by equivalently representing confidence windowing in a lower order equation. A GHSMM uses the same information as an HSMM, and further considers all states in a symbol stream. The method of reconstruction using the GHSMM can be operated on two separate time scales—one time scale relates to prior statistical knowledge about language symbols and the other time scale relates to the relationship between known and unknown symbols within the same stream. The dual time scales make the topology of the system non-stationary.

The reconstruction method is done by first inputting a symbol stream into the system, pre-processing the damaged symbol stream to extract language parameters, applying a generalized HSMM equivalent to confidence windowing to determine the most likely candidates for replacing missing or damaged symbols, post-processing the symbol stream to replace damaged symbols and reconstruct the symbol stream, and outputting the reconstructed stream.

Alternatively, an HSMM is applied to approximate confidence windowing for determining likely candidates to replacing missing symbols. The application of the HSMM is modified by applying a non-commutative product operation and an algorithmic addition to the Viterbi Algorithm in order to maximize the probability of finding the correct replacement symbol for a damaged symbol in the stream.

The invention has been shown to produce repaired symbol streams having greater than 80% accuracy. The accuracy of the system and method make the invention especially useful for evaluating and repairing communications where one party has a speech impediment or a bad connection exists which introduce error and damage to the communication symbol stream. The invention is especially useful for law enforcement and protection, and emergency situations where receiving and understanding as complete a possible symbol stream from a communicating party is essential.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

As used herein, language symbol is intended to mean a discrete element, printed or verbal, such as a phoneme or group of phonemes, a letter or a number, which can be represented in a model and is part of a known system for communicating, such as a spoken or written language, or a number system.

The term acoustic symbol is used to mean an element comprising a single distinct sound. A phoneme or language symbol may comprise one or more acoustic symbols. For example, the language symbol could be a word, like "invention" which comprises several phonemes and even more acoustic symbols; or, the language symbol could be a single phoneme, such as "eh" or "um", which comprise only a few acoustic symbols. Still further, the acoustic symbol could be a single tone or note or sound, such as in a musical composition.

Unless specified otherwise herein, "symbol" is intended to mean a language symbol.

The application of the method and system described herein assumes that the damaged sequence of symbols is part of a language that has a structure with parameters that can be modeled.

And, as used herein, the term language is used to refer to spoken and written languages such as English, Spanish, or Japanese, as well as to other communications systems having structure and parameters which can be identified and quantified, such as music or numeric systems.

The invention herein provides a new and unique method and system for reconstructing damaged communications formed by sequences of symbols made with a communications language having known parameters. Reconstruction is based on the probability of occurrence of a missing symbol given the overall probability of occurrence and transition probabilities of surrounding symbols. The system includes detection of missing symbols, preprocessing, identification of symbols, determination of the most probable missing symbols, and reconstruction of the overall speech segment with the insertion of the symbol determined to be the best candidate for intelligible communication in the language of the sequence using confidence windowing and hidden semi-Markov modeling, among other techniques, as described in greater detail below.

The Reconstruction Process

Figure 1A:
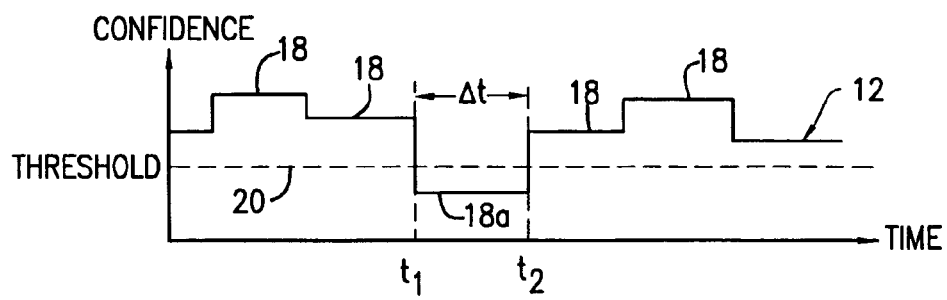
FIG. 1A is a graph showing a confidence level for a communication composed of symbol segments versus time.
Figure 1B:
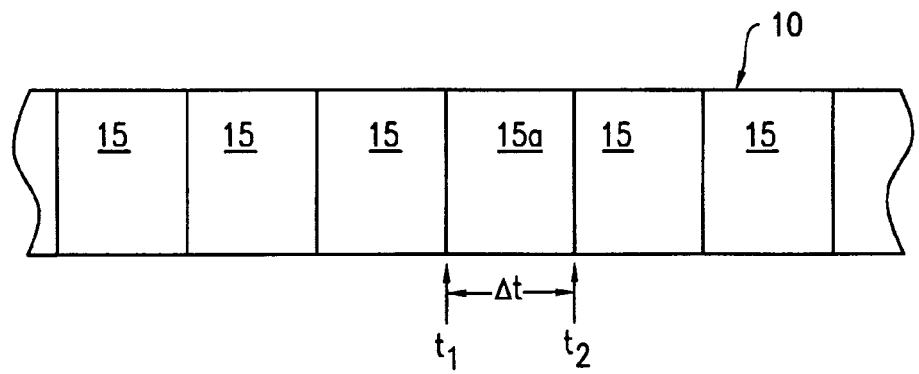
FIG. 1B is a graphical representation of the communication of FIG. 1A.

Referring now to the drawings, in which like reference numerals are used to refer to the same or similar elements, FIGS. 1A and 1B illustrate the general problem of reconstruction of a sequence of symbols in which a stream or sequence 10 of language symbols 15 transmitted from a source to a receptor are damaged in transit so that during a period $\Delta t$ some symbols 15 $a$ in the sequence 10 are unknown or missing.

The symbol sequence 10 can also be viewed in terms of a signal 12 having an amplitude 18, 18$a$ for each symbol in the sequence which is either above or below a threshold value 20. When the amplitude 18 is above the threshold 20, then the symbol 15 is known and can be understood by the receiving party. But, when the amplitude 18$a$ is below the threshold 20, such as between times $t_1$ and $t_2$, the symbol 15$a$ is unknown and must be reconstructed to be understood.

The period $\Delta t$, which is the time $t_2-t_1$, when the unknown symbols 15$a$ are transmitted must be reconstructed using inter-symbol influences. The number of missing or unknown symbols 15$a$ is estimated based on the language of the communication and the size of $\Delta t$. The inter-symbol influences can be modeled statistically to predict which symbols of the language should be used to replace the missing symbols 15$a$ and complete the sequence 10.

The method herein provides a statistical approach to reconstructing the symbol stream 10 based on the known inter-symbol influences of the communication language. Statistical probabilities for the presence of the missing symbols in the stream are generated and the most likely candidates are selected to reconstruct the sequence 10. The candidates are considered in the context of the surrounding known symbols 15 using symmetric and asymmetric windowing around the unknown symbols 15$a$.

Figure 1C:
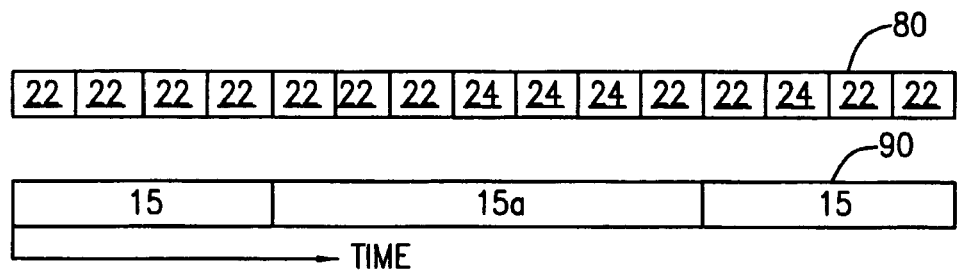
FIG. 1C is a graphical representation of the multiple time scales through which the invention operates.

FIG. 1C depicts the two different time scales 80, 90 in which the present invention may operate. A first time scale 80 is provided in which the invention operates within one phoneme or language symbol 15 of known acoustic symbols 22 and unknown acoustic symbols 24. Additionally, a second time scale 90 consists of known language symbols 15 and unknown language symbols 15a across multiple acoustic symbols 22, 24.

Figure 2A:
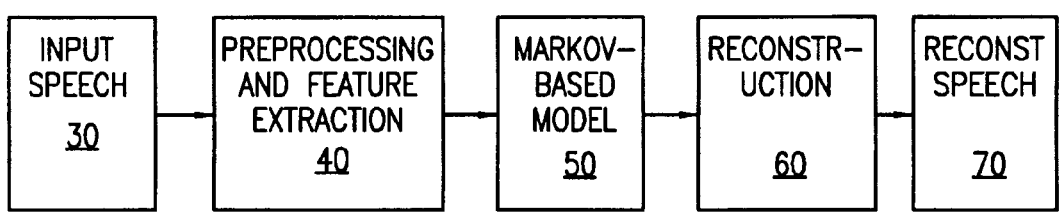
FIG. 2A is a block diagram of the steps for reconstructing a damaged sequence of symbols according to the invention.

A simplified form of the reconstruction process is illustrated in FIG. 2A in terms of speech reconstruction. First, a speech signal is input 30 into the system, followed by preprocessing and feature extraction 40 of the speech signal. A Markov-based model incorporating the features of the input speech signal is applied 50 to damaged speech symbols in the signal sequence as they are received. The Markov-based model approximates confidence windowing to determine the missing or damaged symbols 50. The speech signal is reconstructed 60 using the recovered symbols determined 50 by the Markov-based model. The reconstructed speech is then output 70 by the system.

Reconstruction Models

Confidence windowing forms the basis for reconstruction involving statistical analysis of unknown symbols conditioned or jointly formed on known symbols. The unknown symbol u is a symbol that equips each state in an HMM, HSMM, and GHSMM. The probability of observing u in a state, $b_i(u)$, is the same for every state.

$$b_i(u)=C \; \forall i=1, \ldots, N \; b_i(u) \in B \qquad (1)$$

where N is the number of states in the Markov model. The matrix B also contains the observation probabilities for all symbols in the vocabulary being used. In equation (1), C=0.5 or C=1.0, depending on whether or not the unknown symbol is factored into the stochastic definition of B that requires the probability of each row $Bi$ to sum to one.

Confidence windowing represents the situation in which perfect information about all other states and durations is available. Thus, application of a confidence window to a sequence having missing symbols will result in the best reconstruction of the sequence. An exact model of a confidence window is a high order equation which is complex and time-consuming to solve. The Markov-based models discussed herein approximate confidence windows to different degrees using lower order equations.

FIGS. 4A–4D show confidence windows 200 of different sizes each having one observation pane 210 and multiple transition panes 220. A confidence window 200 is applied to a stream 10 of symbols 15, 15a so that one symbol is seen through each pane 210, 220. As the symbol stream 10 passes through the window 200, for each symbol seen through the observation pane 210, joint probabilities are recorded for symbols appearing in the surrounding transition panes 220.

When a confidence window 200 is used to evaluate a symbol stream 10 to suggest replacements for missing symbols 15a, the observation pane 210 is positioned over an unknown symbol 15a and the symbols in the surrounding transition panes 220 are used to suggest the correct replacement symbol 15. As might be expected, and can be shown by experimental data, the larger the confidence window 200 used to evaluate the stream 10, the greater the accuracy of the resulting reconstruction using suggested replacement symbols 15.

Confidence windowing used alone, however, considers only the probability of occurrence for unknown phonemes or symbols conditioned or jointly considered on all known phonemes or symbols to reconstruct a symbol stream. That is, individual acoustic vectors or duration are not considered by confidence windowing.

Hidden Markov models are the least accurate approximation of confidence windows, since they account for only the prior and post states surrounding a missing symbol to determine and reconstruct the missing symbol. Hidden semi-Markov models are more accurate because they include the state duration information, or inter-symbol influence, for the prior, post, and missing states. Generalized hidden semi-Markov models are the most accurate approximation, and are substantially equivalent, to confidence windows. A GHSMM considers all prior and post states in the symbol stream, as well as the duration in each state.

As a simplified example, in a sentence of several words having missing letters, an HMM considers only a missing letter and the surrounding two known letters in a given word to reconstruct the word. A HSMM still considers only the surrounding two letters in the work, but also includes the inter-symbol influence of the known letters on the missing letter. A GHSMM considers the entire sentence and the inter-symbol influence of each letter on the others.

Figure 2B:
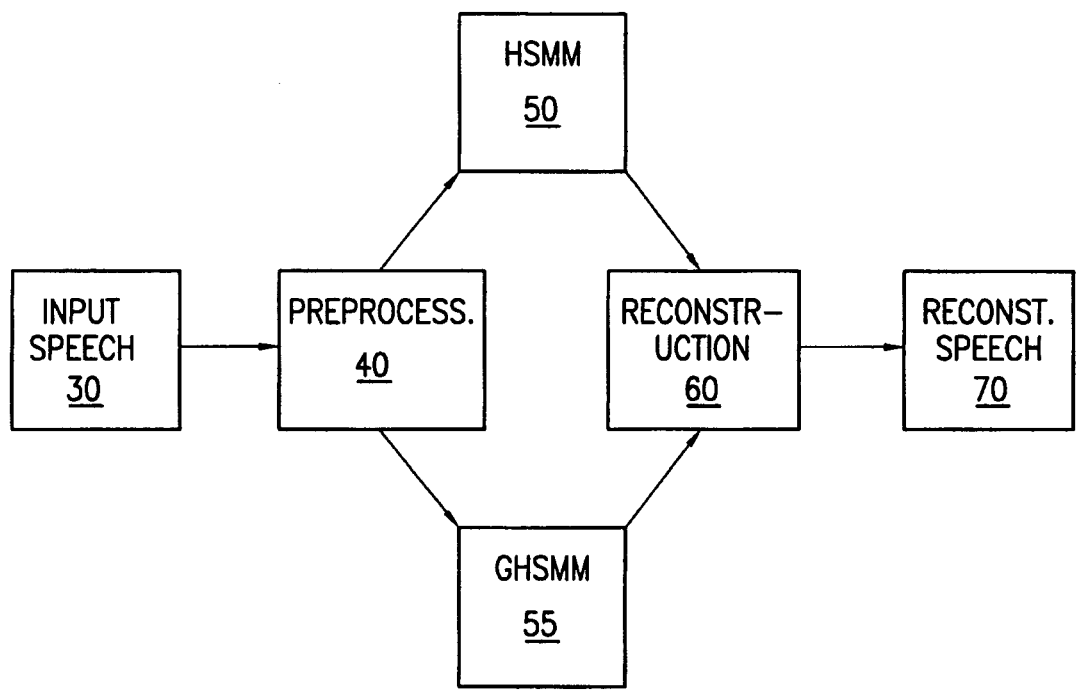
FIG. 2B is a graphical representation of the reconstruction using the two separate time scales of operation.

As seen in FIG. 2B, in accordance with the invention a GHSMM is alternatively applied 55 to damaged speech symbols. The GHSMM is an HSMM that also accounts for inter-symbol influences using a second time scale, and thereby has two regeneration times. The speech signal is reconstructed 60 based on the results of the HSMM application 50 or the GHSMM application 55, and then the reconstructed speech signal is output 70 for use. The application of the GHSMM 55 exclusively to the speech signal will provide the most accurate results, and significantly more accurate than application of the HSMM 50 alone.

The preprocessing and feature extraction 40 involves sampling, filtering noise from the input signal and windowing the signal. Windowing is a process of dividing the signal into discrete windows, so that the signal can be considered as discrete symbols, as discussed further below. Feature extraction can be done for a number of parameters, such as PARCOR coefficients, but LPC cepstrum are preferred.

In preprocessing and feature extraction 40, a corpus is used to produce language parameters to create the HSMM or GHSMM. The language parameters remain fixed during reconstruction. Preprocessing and feature extraction 40 is done for each reconstruction, and then matched by the GHSMM or HSMM to the language parameters taken from the corpus. The corpus contains the information for the A, B and D matrices, discussed further below, which are determined in the preprocessing step 40 of FIGS. 2A and 2B. The GHSMM in turn contains the A, B, D and Π matrices of a corresponding HSMM, which are generated from a corpus. However, the GHSMM will only revert to the HSMM in special circumstances.

It should be noted that application of the GHSMM has also been shown to be equivalent to confidence windowing with language parameters and approaches the same accuracy. Important language parameters for which values must be obtained are observation probabilities of symbols in the language, transition probabilities from one symbol to another, and the duration of each symbol.

Further, it should be apparent that the language parameters may be speaker-dependent in some instances, such as when a spoken language like English or Spanish or Chinese is being reconstructed. Each of these languages has dialects which differ from each other and are further subject to pronunciation differences between speakers who use the language. Thus, some basic information common to all speakers of a language can be obtained from a text of the language, but other information requires a sample of the speaker whose speech will be reconstructed. Obviously, in cases where the language sequence sources are uniform for a language, either a training text or a sample of one of the sources using the language can be used for feature extraction. This data is used to form the corpus.

An important feature of the invention, however, is that a GHSMM used to evaluate and reconstruct the damaged symbols in a stream for a given speaker or communicator can be generated from the symbol stream itself. That is, the speaker is characterized, the A, B, D and Π matrices are formed, and the GHSMM is applied 55. Once the language parameters for a given speaker, or group of speakers as the case may be, are generated, the GHSMM can be developed for the speaker. The hidden semi-Markov models used herein are discrete observation GHSMMs, in which the number of possible observation symbols is finite.

Figure 3:
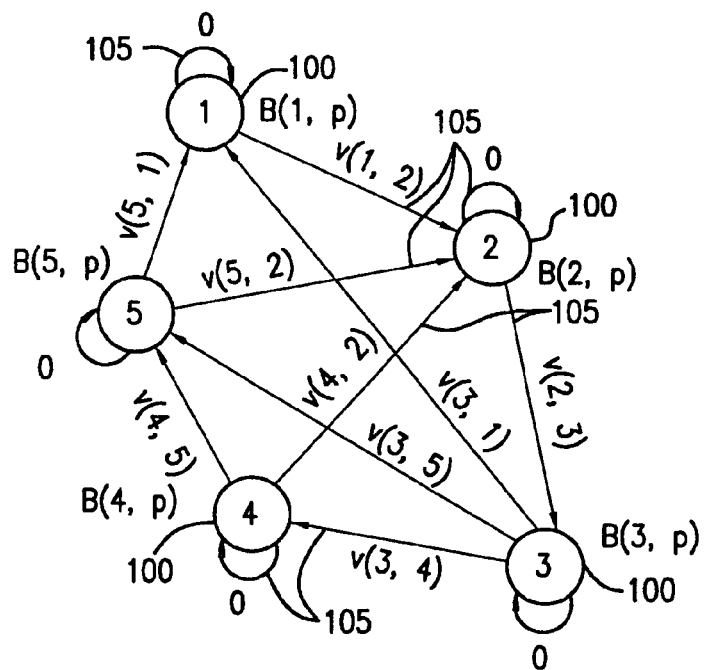
FIG. 3 is a is a state probability diagram for a five state HSMM.

FIG. 3 depicts a five state discrete HSMM as an example having the following characteristics and values:

$A = \{a_{ij}\}$ is the state probability distribution matrix.

$B = \{b_j(k)\}$ is the observational probability distribution matrix.

N is the number of states in the model.

$D = \{d_1(\tau), d_2(\tau), \ldots, d_N(\tau)\}$ is the state occupancy distribution vector wherein $d_i(\tau)$ is the probability of staying the state i for $\tau$ time units.

$V = \{V_1, V_2, \ldots, V_n\}$ is the set of each state's possible observation symbols.

M is the number of distinct observation symbols per state (size of vector quantization codebook), and wherein $\Pi = \{\Pi_i\}$ is the initial state distribution vector, so that the HSMM of FIG. 3 is described in notation as $\lambda = \{A, B, \Pi, D\}$.

As shown in FIG. 3, the HSMM has five states 100, with vectors 105 indicating possible state changes. The observational probability matrix B associated with each state 100 is shown adjacent the state 100.

The general problem of reconstruction, as set forth above, on a symbol by symbol basis consists of reclaiming the missing symbols 15a from a stream 10 of known symbols 15 using statistical techniques, such as an HSMM of FIG. 3. The HSMM needs to take into account inter-symbol influences between states 100. That is, there must be correlation between states 100 and the possible disparity of effect between the observation probabilities $b_j(o_t)$ and state durations $d_i(\tau)$ in probability evaluation. The effect of known symbols on unknown symbols must be accounted for in order to improve the accuracy of the system. Therefore, inter-symbol influences must be included in the product terms of the equations embodying the HSMM in order to account for known observations in reconstruction and also develop balancing relationships between correlated $b_j(o_t)$ and $d_i(\tau)$ so as to include observation duration for reconstruction of symbols in a sequence.

Use of the GHSMM to Reconstruct Speech

Referring again to FIG. 2A, the application of a GHSMM 55 captures inter-symbol influences as can be shown by experimental results using the confidence windowing method, discussed in greater detail below. The GHSMM 55 operates on multiple time scales, such as the two scales for language symbols 15, 15a and acoustic symbols 22, 24 as illustrated in FIG. 1C, to capture the inter-symbol influences. The inter-symbol influence is both a screening, or decision-making, of the data set (vocabulary, or symbols of the language) to include only those symbol stream segments in the data set that at least partially match the symbols 15 around a missing symbol 15a. That is, use of the GHSMM 55 permits exclusion from consideration of transitions to states 100 which are not possible based on the language parameters and surrounding known symbols 15 when applying the HSMM to reduce the number of possible states 100 in the HSMM equations.

The pre-processing 40 can be accomplished through the following steps. First, known symbols 15 in a stream 10 are grouped into a first group of states and unknown symbols 15a are placed in a second group of states. In some cases, a non-commutative probability product operator can be placed in the HSMM B (observation probability) matrix to support time order in HSMM Viterbi Algorithm and evaluation products such as equation (1) described below. The operator is a function of time order in a confidence window.

A minor change is then applied to the Viterbi Algorithm to retrieve the missing symbols. The change is a simple maximization-based step, which will be appreciated by one versed in statistics. The reconstruction is then done by the resulting generalized model, which leverages terms of equation (1), to generate a probability of reconstruction P(R):

$$P(R) \propto d_k(t_k) \prod_{\theta=1}^{\tau_k} b_k(o_\theta) a_{ku} d_u(t_u) \prod_{\phi=\tau_k+1}^{T} b_u o_\phi \quad (2)$$

where k denotes terms for known symbols and u denotes terms for unknown symbols, as obtained from the HSMM Forward and Backward variables:

$$\alpha_t(j) = \sum_{\tau=1}^{t} \sum_{\substack{i=1 \\ i \neq j}}^{N} \alpha_{t-\tau}(i) a_{ij} d_j(\tau) \prod_{\theta=0}^{\tau-1} b_j(o_{t-\theta}) + \quad (3)$$

$$\Pi_j d_j(t) \prod b_j(o_{t-\theta})$$

when $1 \leq j \leq N$ and $1 \leq t \leq T$ and, $$\beta_t(i) = \sum_{\tau=1}^{T-\tau} \sum_{\substack{j=1 \\ j \neq 1}}^{N} a_{ij} d_j(\tau) \beta_{\tau+1}(j) \prod_{\theta=0}^{\tau} b_j(o_{t+\theta}) \quad (4)$$

when $1 \leq j \leq N$ and $1 \leq t \leq T$

In equation (2) the form for transitioning known to unknown symbols is apparent by the separation of the k (known) probability product term from the u (unknown) probability product term by the transition probability from known to unknown, $a_{ku}$.

Figure 5A:
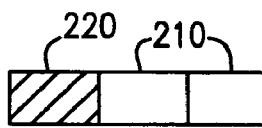
FIGS. 5A–5C are graphical representations of a three pane confidence window used to evaluate a symbol stream.
Figure 5B:
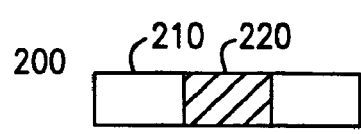
Figure 5C:
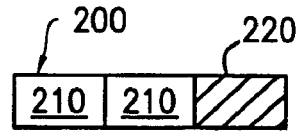

For a further understanding of the application of the pre-processing 40, GHSMM 55 and reconstruction/post-processing 60 steps, the steps are illustrated using the equivalent confidence windows 200 shown in FIGS. 5A–5C and operations shown in FIGS. 6A–6D. The example illustrated is applicable to a system having a small vocabulary with few symbols, each of which has as a different duration. As noted above, the HSMM and GHSMM models are solvable equivalents to the confidence windows.

FIGS. 5A–5C show the three confidence windows 200 that will be used in the example. Each confidence window 200 has two transition panes 210 and one observation pane 220, for a total of three panes.

The symbol pre-processing step 40 using these confidence windows 200 is illustrated in FIGS. 6A–6D. The pre-processing step 40 is done in preparation for a generalized HMM/HSMM that transitions known symbols to unknown symbols. In each case shown in FIGS. 6A–6D, the amount of known information is strictly greater than the unknown information—there is only one observation pane 220 per window 200. Pre-processing 40 is done by applying simply circular rotations with the confidence windows 200 as seen in the drawings.

Figure 6A:
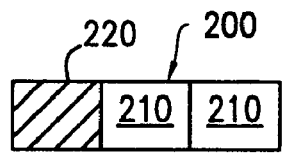
FIGS. 6A–6D are graphical representations of operations conducted using the three pane confidence window of FIGS. 5A–5C.
Figure 6A:
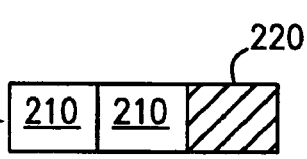
Figure 6B:
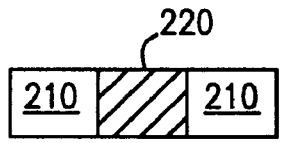
Figure 6B:
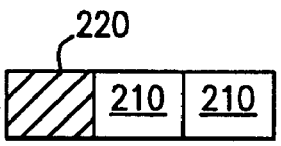
Figure 6C:
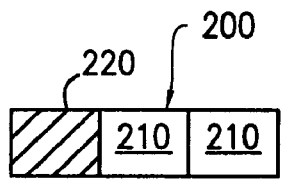
Figure 6C:
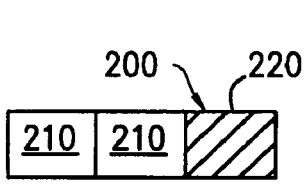
Figure 6D:
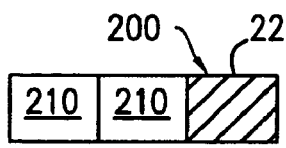
Figure 6D:
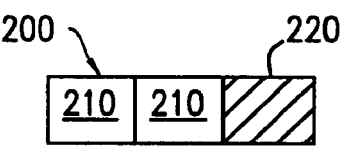

As can be seen, in FIG. 6A, the observation pane 220 is rotated left from the left-most position to the right-most position, while in FIG. 6B the observation pane 220 rotates from the middle position to the left-most position. In FIG. 6C, the positions of the transition panes 210 and observation pane 220 are reversed, and in FIG. 6D, there is no change.

The post-processing reconstruction 60 is done by applying the opposite operations to those of FIGS. 6A–6D. That is, a circular rotation right and reversal operations are applied.

Figure 7:
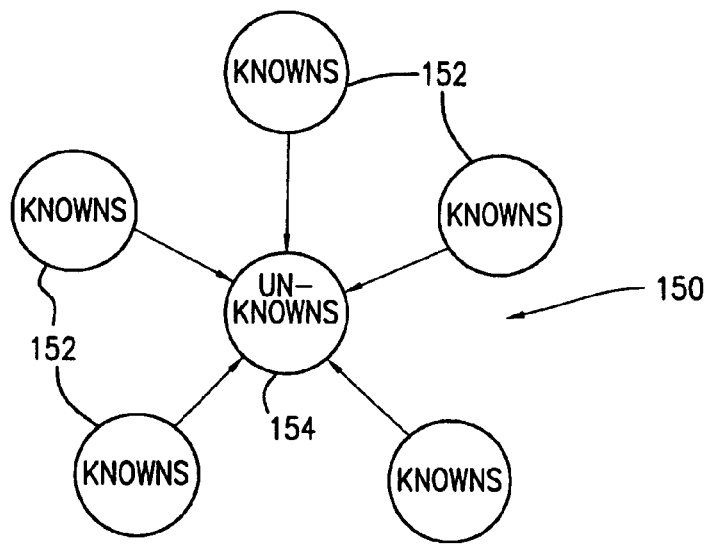
FIG. 7 is a diagram showing transitions from known to unknown symbols during pre-processing of a symbol stream.

FIG. 7 is a depiction of the operation of a generalized HMM 150 that is equivalent to using confidence windowing. The generalized HMM 150 transitions the known symbols 152 to unknown symbols 154. In the generalized HMM 150, the entry states 152 of the model 150 also perform decision making, which help with reconstruction 60 later.

Figure 8:
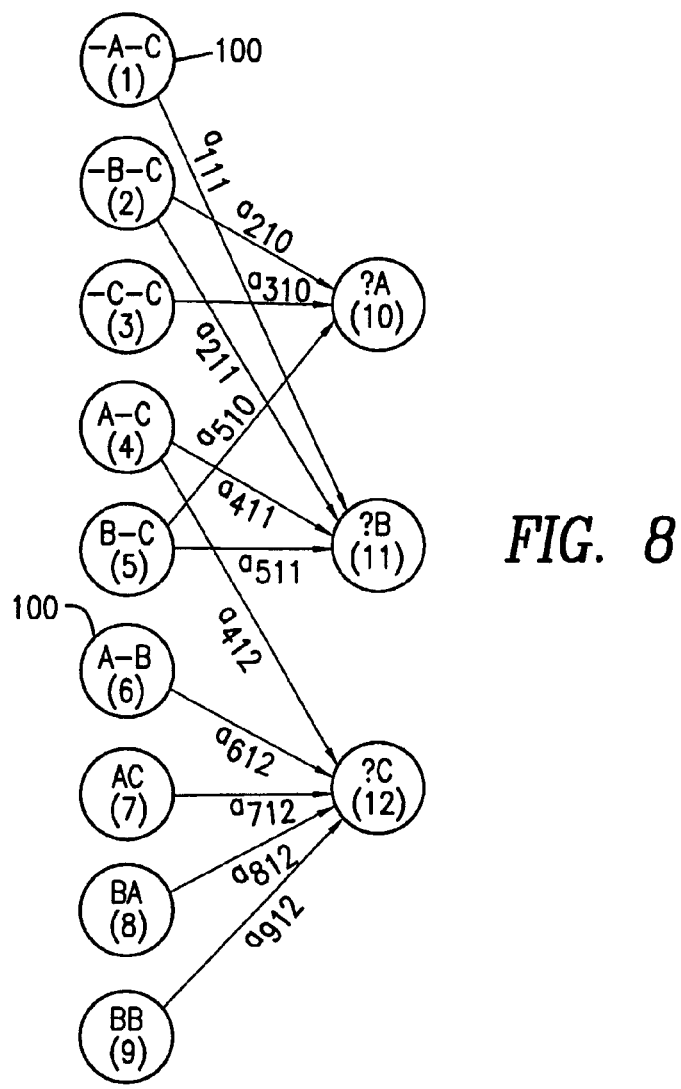
FIG. 8 is a state diagram for a small vocabulary HSMM.

FIG. 8 illustrates the possible states 100 for a generalized HSMM used to demonstrate the equivalency with confidence windowing and application of the process of the invention. The vocabulary, or groups of symbols, which are valid combinations in this system are: ABC, BBC, BAC and ACC. These four words in the vocabulary can be reconstructed using the model or confidence windowing. As used in FIG. 8, where a symbol in the text adjacent a state 100 is shown preceded by a minus sign "–", it indicates a time-shifted symbol. The pre-processing 40 function causes the time-shifting. A "?" indicates an unknown symbol, equivalent to the observation pane 220 of the confidence windows 200.

The table below shows the results of evaluating the generalized HSMM of FIG. 8 and using confidence windowing to evaluate the same generalized HSMM. As can be seen, the two methods provide identical results for reconstructing the same vocabularies:

| Word | Generalized HSMM Symbol, P(R) | Confidence Window Symbol P(R) |
|---|---|---|
| ?AC | B, P(R) = 1.0 | B, P(R) = 1.0 |
| ?BC | A, P(R) = 0.667 | A, P(R) = 0.667 |
| ?CC | A, P(R) = 1.0 | A, P(R) = 1.0 |
| A?C | B, P(R) = 0.667 | B, P(R) = 0.667 |
| B?C | A, P(R) = 0.5 | A, P(R) = 0.5 |
| AB? | C, P(R) = 1.0 | C, P(R) = 1.0 |
| AC? | C, P(R) = 1.0 | C, P(R) = 1.0 |
| BA? | C, P(R) = 1.0 | C, P(R) = 1.0 |
| BB? | C, P(R) = 1.0 | C, P(R) = 1.0 |

That is, the results show that the GHSMM and confidence windowing are equivalent.

In order to achieve these results, it was discovered that two changes to the algorithms used to solve the HSMM are needed. The first change is the use of a non-commutative multiplication operator in the products of equation (2), above. A non-commutative multiplication operator is one in which A*B≠B*A. That is, the particular order in which the multiplications of the $b_j(o_t)$ terms are performed in equation (2) is important to achieving accurate reconstruction.

One manner of accomplishing the non-commutative behavior is to stipulate the position (time-shift) location where a given probability will be non-zero. In other words, the probability must appear in a certain time slot. For example, in equation (2), $\lambda_a$ and $\lambda_b$ must appear in a certain time order, while λ may appear in any order of any product in equation (2). Thus:

$$\lambda_a = \lambda \text{ if } [\theta \geq 4, 1, 0] \quad (5)$$

$$\lambda_b = \lambda \text{ if } [\theta \geq 3, 1, 0] \quad (6)$$

The terms $\lambda_a$ and $\lambda_b$ are examples of the use of a non-commutative operator in the B (observation probability) matrix. This operator can also be applied to the transition probabilities $a_{ku}$ of the A (transition probability) matrix. The reconstruction matrix R shown below combines the B and A matrices:

$$R = \begin{vmatrix} 0 & 0 & 0 & \lambda & 0 & \lambda & 0 & 0 & 0 & 0 & 1.0 & 0 \\ 0 & 0 & 0 & 0 & \lambda & \lambda & 0 & 0 & 0 & 0.67 & 0.33 & 0 \\ 0 & 0 & 0 & 0 & 0 & \lambda & 0 & \lambda & 0 & 1.0 & 0 & 0 \\ \lambda & 0 & 0 & 0 & 0 & \lambda & 0 & 0 & 0 & 0 & 0.67 & 0.33 \\ 0 & \lambda & 0 & 0 & 0 & \lambda & 0 & 0 & 0 & 0.5 & 0.5 & 0 \\ \lambda_a & \lambda & 0 & 0 & 0 & 0 & 0 & 0 & 0 & 0 & 0 & 1.0 \\ \lambda & 0 & \lambda & 0 & 0 & 0 & 0 & 0 & 0 & 0 & 0 & 1.0 \\ \lambda & \lambda_b & 0 & 0 & 0 & 0 & 0 & 0 & 0 & 0 & 0 & 1.0 \\ 0 & \lambda & 0 & 0 & 0 & 0 & \lambda & 0 & 0 & 0 & 0 & 1.0 \\ \lambda & 0 & 0 & 0 & 0 & \lambda & 0 & 0 & 0 & 0 & 0 & 0 \\ 0 & \lambda & 0 & 0 & 0 & \lambda & 0 & 0 & 0 & 0 & 0 & 0 \\ 0 & 0 & \lambda & 0 & 0 & 0 & \lambda & 0 & 0 & 0 & 0 & 0 \end{vmatrix}$$

The second change that is made is to apply an algorithmic addition to the Viterbi Algorithm, which is a procedure for finding the most likely state sequence in an HMM/HSMM. A maximization step, performed across the first eight columns of the reconstruction matrix R is done so that the maximum λ is selected that is not the symbol "?" (unknown). The first eight columns of the reconstruction matrix R are labeled as:

$$v = \{``A", ``B", ``C", ``-A", ``-B", ``-C", ``?", ``R"\} \quad (7)$$

which is the codebook, or legal symbols, for the model of FIG 8. The character "R" represents the repeat character, which indicates that the preceding one of the other legal symbols is repeated. In a more compact form, the change to the Viterbi Algorithm can be expressed as:

$$S_R = \max_j [B(i_T^*, j)] \quad (8)$$

such that, $S_R \neq ?$, and where $S_R$ is the symbol used to reconstruct the symbol stream and the state $i^*_T$ is the most likely state at time T, the final ending time, as determined by the Viterbi Algorithm.

Using a GHSMM with these changes, or the equivalent confidence window technique, permits rapid analysis and reconstruction of a symbol stream with high accuracy. The GHSMM and confidence windowing incorporate observation probabilities and transition probabilities between symbols, as well as duration of symbols. These characteristics and others are modeled as language parameters that can be used to reconstruct a stream of symbols in the corresponding language, when the symbol stream includes damaged symbols.

Theory of Operation of the GHSMM

The GHSMM however, has advantages over the HSMM that make the operation of GSHMM equivalent to confidence widowing. The HSMM is defined by the notation $\lambda=\{A, B, \Pi, D\}$, which incorporates two major differences from the HMM. First, the diagonal elements $a_{ii}$ of the transition matrix A are all zero, indicating that states persist due to another factor. The matrix D, which contains the duration probabilities $d_j(\tau)$ for each state, allows states to persist for multiple time steps by providing arbitrary state duration distributions. These durations are effectively enforced regeneration times for the HSMM chain. Using these distributions, transitions $a_{ij}$ are made only when a statistically appropriate time has elapsed for that state.

Because transition decisions are made only at the boundaries of phonemes, the symbol output during backtracking is simply the most likely symbol for a given state. Thus the unknown symbol of equation (1) or any spurious known symbols are all overwritten by the same symbol for the duration of the phoneme. The HSMM thus has a low pass effect on incorrect and unknown symbols in a given state, and has a regeneration time on the order of a phoneme. The HSMM Viterbi formulation is thus superior to the HMM at Time Scale 80:

$$p_1 = \max_{\tau \leq t-1} \max_{\substack{1 \leq i \leq N \\ i \neq j}} a_{ij}\delta_{t-\tau}(i)d_j(\tau)\prod_{\theta=0}^{\tau-1} b_j(o_{t-\theta}) \quad (9)$$

$$p_2 = \pi_j d_j(\tau) \prod_{\theta=0}^{\tau-1} b_j(o_{t-\theta})$$

$$\delta_t(j) = \max(p_1, p_2)$$

$$\Psi_t(j) = \begin{cases} \{j, t\} & p_2 \geq p_1 \\ \arg\max_{i,\tau}\left(a_{ij}\delta_{t-\tau}(i)d_j(\tau)\prod_{\theta=0}^{\tau-1} b_j(o_{t-\theta})\right) & \text{otherwise} \end{cases}$$

The HSMM still suffers from the effects of the two-sided Markov property in time scale 90. Because transition probabilities are conditioned only on the prior state, difficulties arise in the presence of large amounts of unknown symbols having statistics such as equation (1). An HSMM not trained for a specific symbol sequence loses important information in this case. If multiple successive phonemes are unknown, the HSMM must then rely only the underlying chain transition probabilities augmented with duration probabilities for making decisions during Viterbi decoding. As damage may occur to only beyond one phoneme or beyond phoneme boundaries, the first order conditioning present in the 2-sided Markov property may cause reconstruction errors.

The duration probability of equation (9) can help mitigate the effects of the two-sided Markov property somewhat, but only if damage is strictly confined to a phoneme. Additionally, if the durations of two phonemes are very similar or identical, duration information is then confounded; hence the use of the confidence window method as a basis for reconstruction. Because of these difficulties, an HSMM not trained for a specific symbol sequence will lose effectiveness at time scale 90 if a large amount of damage is present. In any event, the HSMM is greatly superior to the HMM at time scale 80.

Practical Reconstruction Using a GHSMM

The use of the GHSMM, however, overcomes the difficulties associated with the 2-sided Markov property and large amounts of damage by incorporating a non-stationary A matrix that does not require Baum-Welch EM training for a specific sequence. In this matrix, each element $a_{ij}$ is augmented with additional memory that is capable of extending the regeneration time of the chain to T the length of any given sequence:

$$\tilde{a}_{ij} = f(a_{ij}, t, w_{ij}) \quad w_{ij} = \{W_1, W_2, \ldots, W_n\}$$

$$\tilde{a}_{ij} = a_{ij}Pr(a_{ij}|t)Pr(a_{ij}\epsilon\omega=\{s_{i_1 i_2}, \ldots, s_{i_{n-1}i_n}\}) \quad (10)$$

The new transition probabilities $\tilde{a}_{ij}$ are thus a function of time and of the random variables $W_v$ contained in set $w_{ij}$.

The probability $Pr(a_{ij}|t)$ is obtained in a straightforward manner from the regeneration time of the entire utterance, T. For simplicity, this probability is modeled with a uniform distribution, which in discrete time is a function of discrete variable $\epsilon$.

$$Pr(a_{ij}|t) = \frac{u[t_{a_{ij}} - \epsilon] - u[t_{a_{ij}} + \epsilon + 1]}{(t_{a_{ij}} + \epsilon + 1) - (t_{a_{ij}} - \epsilon)} \quad 0 \leq \epsilon \leq int\left(\frac{T}{2}\right) \quad (11)$$

where u(t–a) is the common unit step function and $t_{a_{ij}}$ is the time $a_{ij}$ occurred. The parameter $\epsilon$ can be interpreted as uncertainty in transition time.

The probability of configuration of state transitions $\omega$ as given by a Markov Random Field (MRF) (see Kemeny et al., *Denumerable Markov Chains*, Springer-Verlag, New York, 1976 and Meyn, S. P., and Tweedie, R. L., *Markov Chains and Stochastic Stability*, Springer-Verlag, London, Great Britain, 1993) is designated by the following equation:

$$Pr(a_{ij}\epsilon\omega=\{s_{i_1 i_2}, \ldots, s_{i_{n-1}i_n}\}) \quad (12)$$

The set $w_{ij}$ contains integers Z indicating the transition sequences S that the stationary transition $a_{ij}$ has participated in. These transition sequences can be of any length, and the integer random variables $W_v$ represent the location of transition sequences S when arranged in a canonical (sorted) order:

$$w_{ij}=\{W_1, W_2, \ldots, W_n\} \quad W_i \epsilon Z$$

$$W_i=\arg(S) \text{ if } a_{ij} \text{ occurs in } S \in \mathcal{S} \quad (13)$$

where $S \in \mathcal{S}$, $\mathcal{S} \equiv$ the set of possible transition sequences $\mathcal{S}=\{S_{12}, S_{23}, \ldots, S_{n-1\ n}\}$ and n=number of transitions in a given transition sequence.

The key to the second, longer regeneration time of the GHSMM is the following. The random variable sets $w_{ij}$ are used in a Markov Random Field applied to the GHSMM Viterbi lattice after the first Viterbi pass. The first Viterbi pass produces an additional, generalized observation sequence $O_{2,left}=\{w_{12}, w_{23}, \ldots, W_{n-1\ n}\}$ and $O_{2,right}=\{w_{n-1\ n}, \ldots, w_{32}, w_{21}\}$ where n is the number of state transitions determined from the first Viterbi pass.

These observation sequences $O_2$ represent memory over a regeneration time of T, the length of the observation O. Because the $w_{ij}$ in $O_2$ are observations of entire transition sequences, they describe a longer regeneration time. Up until the point of generating the {0} (null) set, the time order intersections $$w_{left} = w_{12} \cap w_{23} \cap \ldots \cap w_{n-1\ n},\ w_{right} = w_{n-1\ n} \cap \ldots \\ w_{32} \cap w_{21} \qquad (14)$$

yield the identities the transition sequences that could have produced O. A simple cellular automaton calculates a w*

$$w^* = g(w_{left}, w_{right}) \qquad (15)$$

where g( . . . )can include an intersection, expectation, or make w* a small list of $W_i \in Z$.

The result w* is then used in a MRF on the Viterbi GHSMM trellis. This MRF is interleaved directly into a second Viterbi pass. After the first Viterbi pass, the time variable t can be thought of as a generalized spatial variable since the length of observation sequence O is known and fixed. Because of this, the trellis dimensions are then fixed.

Additionally, the transition time probability equation (11) ensures that each state in the trellis can be considered distinct since its likelihood is dependent upon time t, which has been changed to the generalized spatial variable. Thus, we have a situation where equation (10) can be applied and the trellis is similar to lattice (see Smyth, Padhraic, *Belief Networks, Hidden Markov Models, and Markov Random Fields: A Unifying View*, Elsevier, Science B. V., Pattern Recognition Letters 18(11–13), November 1997, pp. 1261–1268).

With the GHSMM trellis viewed as a lattice, the probability of transition sequence ω on the lattice can be given by a MRF. This MRF calculates dislocation energy or potential energy of a transition sequence ω containing $a_{ij}$ whose $w_{ij}$ are some distance from w*:

$$P(\omega = \{s_{i_1 i_2}, \ldots, s_{ij}, \ldots, s_{i_{n-1} i_n}\}) = \frac{e^{-\sum_T \min_k |w^* - w_{ij}(k)|}}{Z} \qquad (15)$$

In equation (15) the partition function Z is calculated over all transition sequences ω as:

$$Z = \sum_\omega P(\omega) \qquad (16)$$

Equation (15) is then interleaved into the Viterbi algorithm and onto the GHSMM trellis by noting:

$$P(\omega) = \frac{e^{-\sum_T \min_k |w^* - w_{ij}(k)|}}{Z} \qquad (17)$$
$$= \frac{e^{-\min_k |w^* - w_{s_1 s_2}(k)|}}{\sqrt[T]{Z}} \frac{e^{-\min_k |w^* - w_{s_2 s_3}(k)|}}{\sqrt[T]{Z}} \ldots \\ \frac{e^{-\min_k |w^* - w_{s_{n-1} s_n}(k)|}}{\sqrt[T]{Z}}$$

and together with $a_{ij}$ and equation (11) we obtain equation (10). In practice, the MRF energy function is a function of ε, the overall regeneration time T, and a 'field strength' parameter ξ:

$$P(\omega = \{s_{i_1 i_2}, \ldots, s_{ij}, \ldots, s_{i_{n-1} i_n}\}) = \frac{e^{-\xi(1 - \frac{2\varepsilon}{T})\sum_T \min_k |w^* - w_{ij}(k)|}}{Z} \qquad (18)$$

and equations (11) and (18) are thus coupled. The GHSMM only becomes approximate to the HSMM when ε=T and ξ=O.

As the uncertainty in transition time e is increases, the regeneration time T becomes less significant, and the GHSMM reverts back to the HSMM when ε=T/2. With ε<T/2, the GHSMM performs its own EM at run time by establishing the MRF on the trellis after the first Viterbi pass and before the second. The observation sequence O produced by the second Viterbi pass is taken as the reconstructed utterance.

Figure 9:
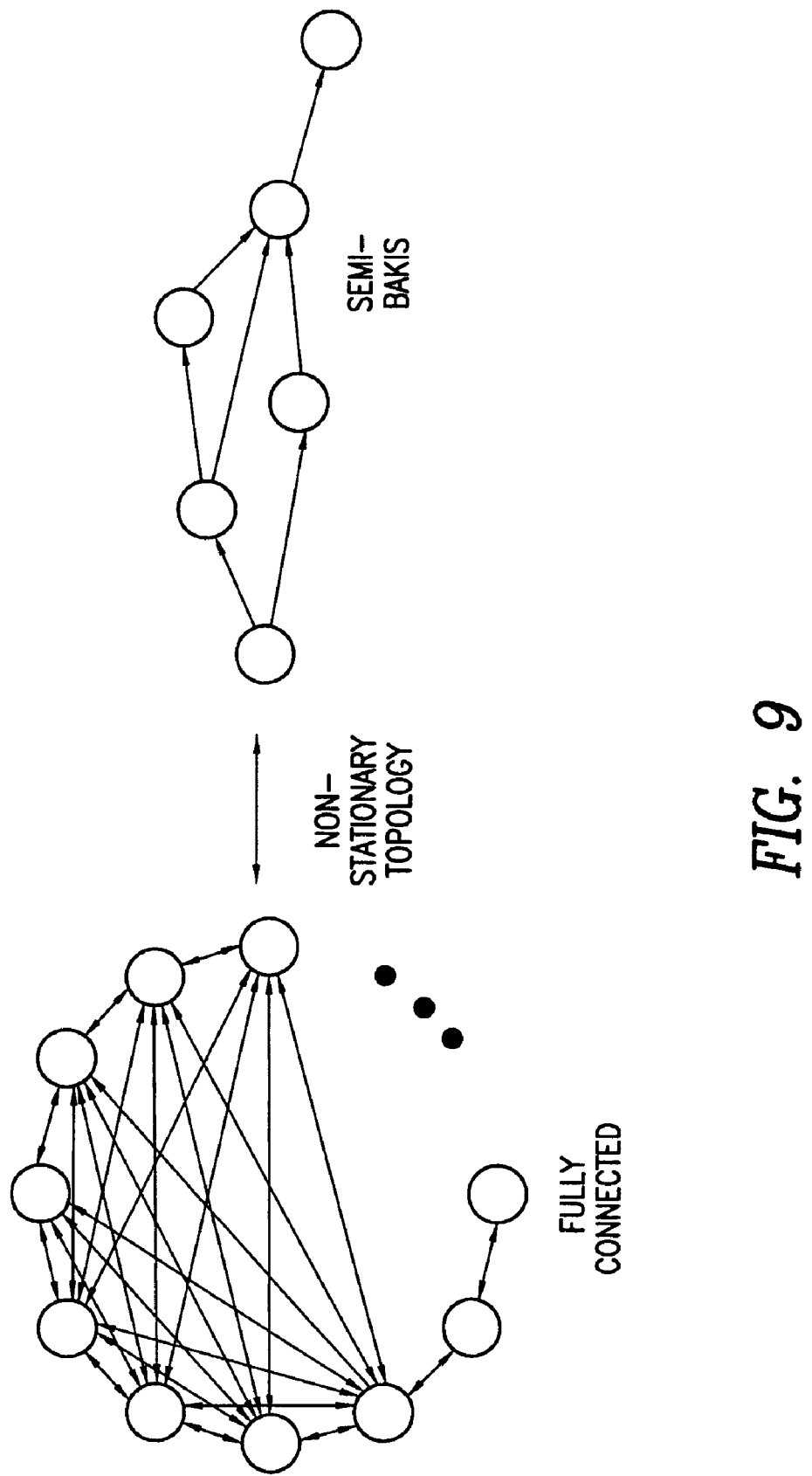
FIG. 9 is a depiction of the operation of the GHSMM equation (10), below, where the topology changes during reconstruction (non-stationary topology)

The effect of the non-stationary matrix À is the non-stationary topology shown in FIG. 9. À is of size $O(N^2 T_{max})$ where $T_{max}$ is the longest utterance regeneration time. As $O(T_{max}) = O(N_U = \text{number of utterances})$, this memory is not excessive. FIG. 9 illustrates the operation of equation (10) or GHSMM in which the topology changes. The GHSMM begins with the fully connected states and possible transition vectors illustrated at the left. As the GHSMM executes and uses known information to eliminate and simplify the equations, the topology changes to the semi-Bakis form, in which only possible transition vectors between states remain.

In cases where w* is a small list, this topology results in an average of about 2.5 Viterbi passes being required for each reconstruction. In this case, the observation sequence O maximizing equation (9) is taken as the reconstructed utterance.

The following examples of the application of the invention to a damaged symbol stream are provided for further illustration of the invention.

EXAMPLE

Reconstruction using the model of FIG. 2B with GHSMM 55 was tested. Three types of reconstruction simulations using the GHSMM on a 200 word vocabulary were performed. Words in the vocabulary V were spoken by a synthesized voice.

First, words were divided into the confidence windows of FIG. 4, the appropriate phoneme damaged with noise, and the confidence window reconstructed. This was performed for increasingly populous subsets of V. Then, words themselves were damaged by noise placed at random locations for random durations. This was also performed for increasingly populous subsets V. Finally, all 200 words in V were randomly damaged and reconstructed while varying ε to examine the effect of uncertainty in transition and utterance regeneration times.

In all simulations, a reconstruction is considered correct if it contains all necessary phonemes in time order. If it does not, it is incorrect. The ratio of correct reconstructions to reconstruction attempts provides the overall reconstruction rate, P(R).

Figure 10A:
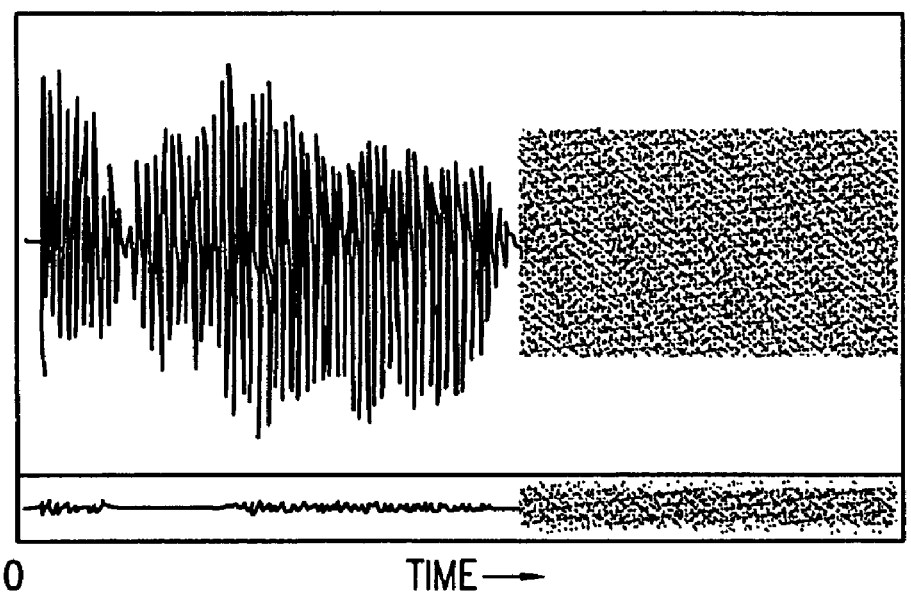
FIGS. 10A–10D are computerized representations of damaged and reconstructed words.
Figure 10B:
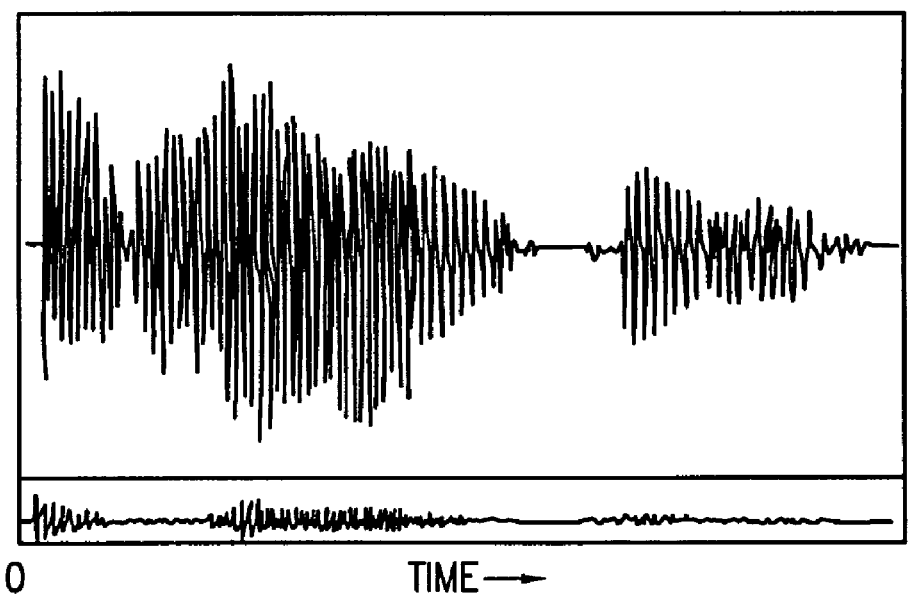
Figure 10C:
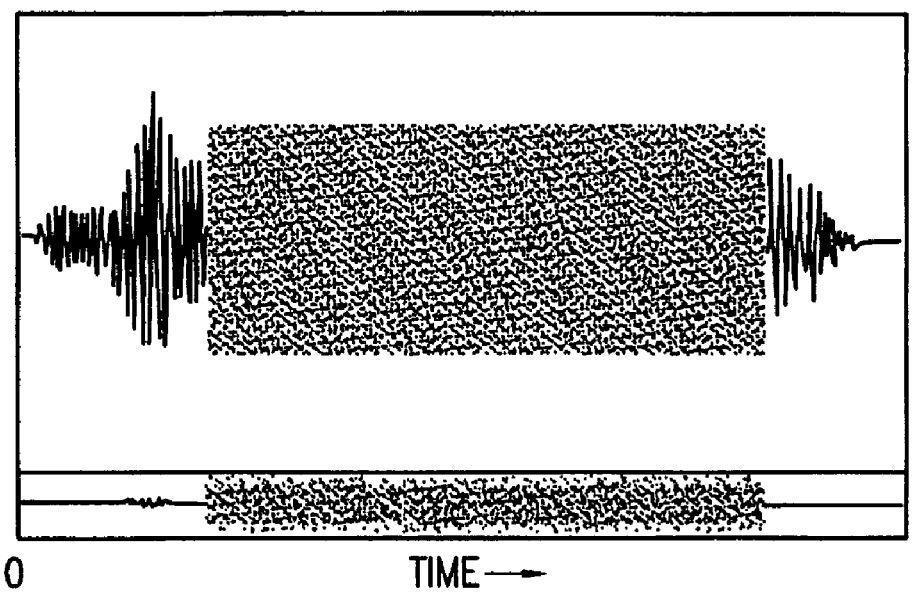
Figure 10D:
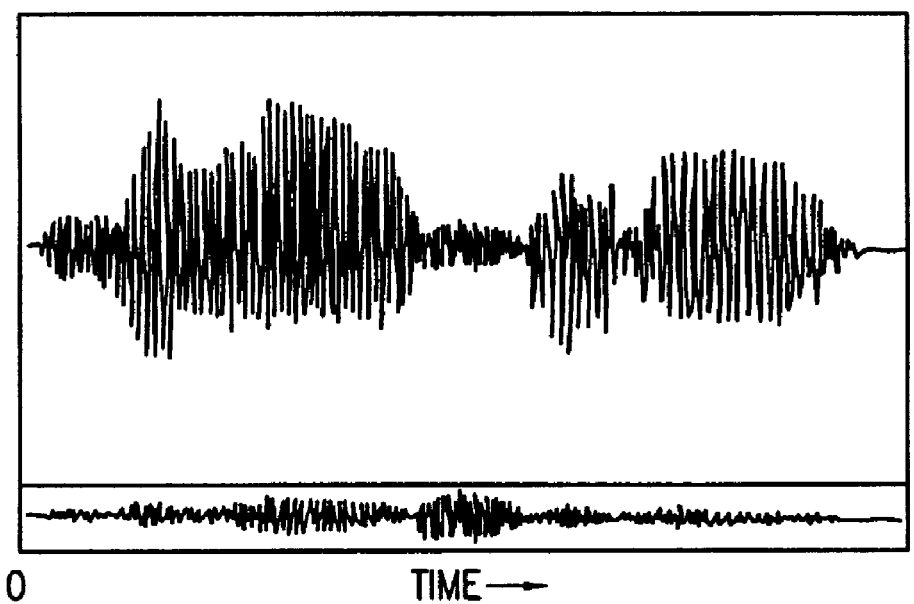

FIGS. 10A–D show selected examples of damaged words and their reconstructions. FIG. 10A depicts a recording of the word "American," when damaged. FIG. 10B shows the same word "American" after reconstruction using the system of the invention. FIG. 10C depicts the recording of the word "velocity," when damaged; and, FIG. 10D illustrates the word "velocity" when reconstructed. The system of FIG. 2B was used to reconstruct the words using the process as described above.

Figure 4A:
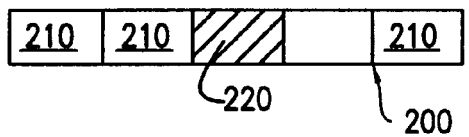
FIGS. 4A–4E are graphical representations of confidence windows used in the invention.
Figure 4B:
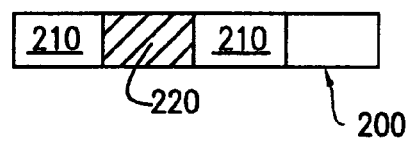
Figure 4C:
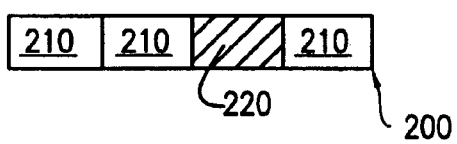
Figure 4D:
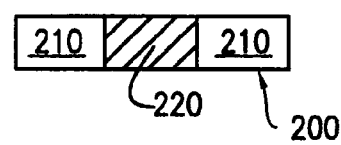
Figure 4E:
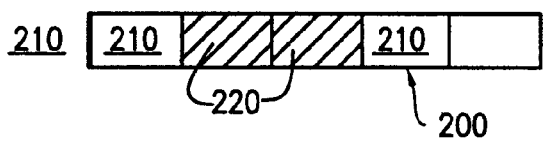
Figure 11A:
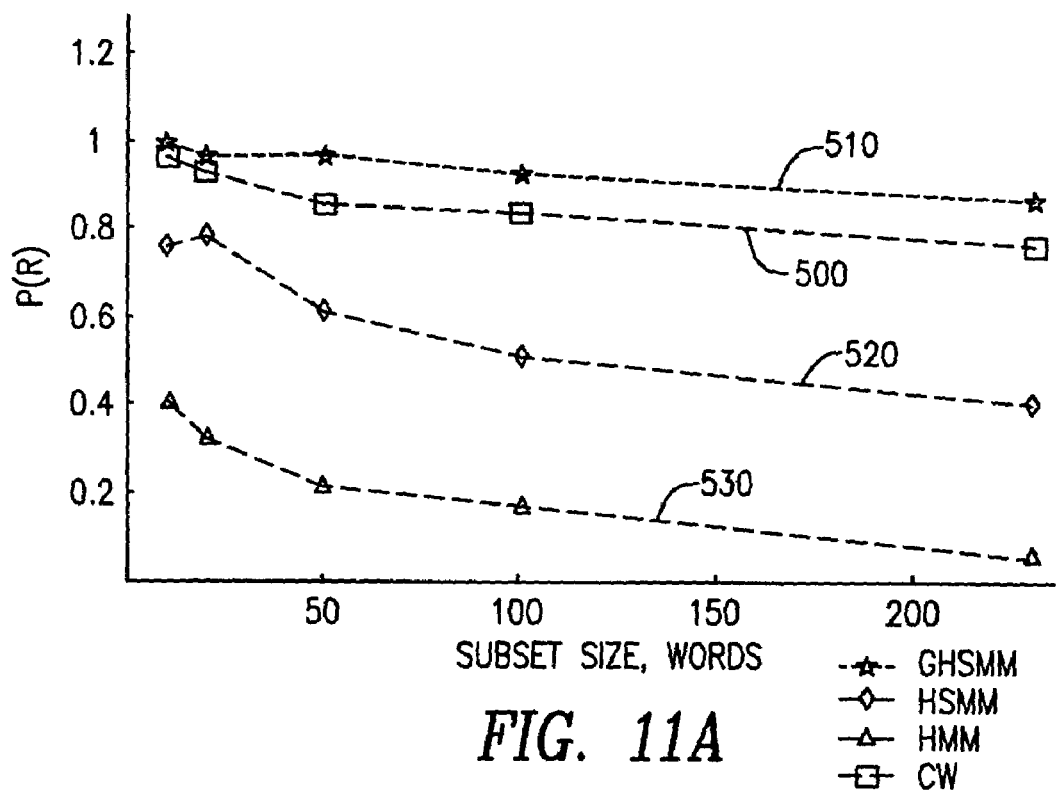
FIGS. 11A–11E are graphs plotting the reconstruction rate P(R) versus increasing vocabulary sets V for the GHSMM, HSMM, HMM, and confidence windowing methods for a particular window of symbols.
Figure 11B:
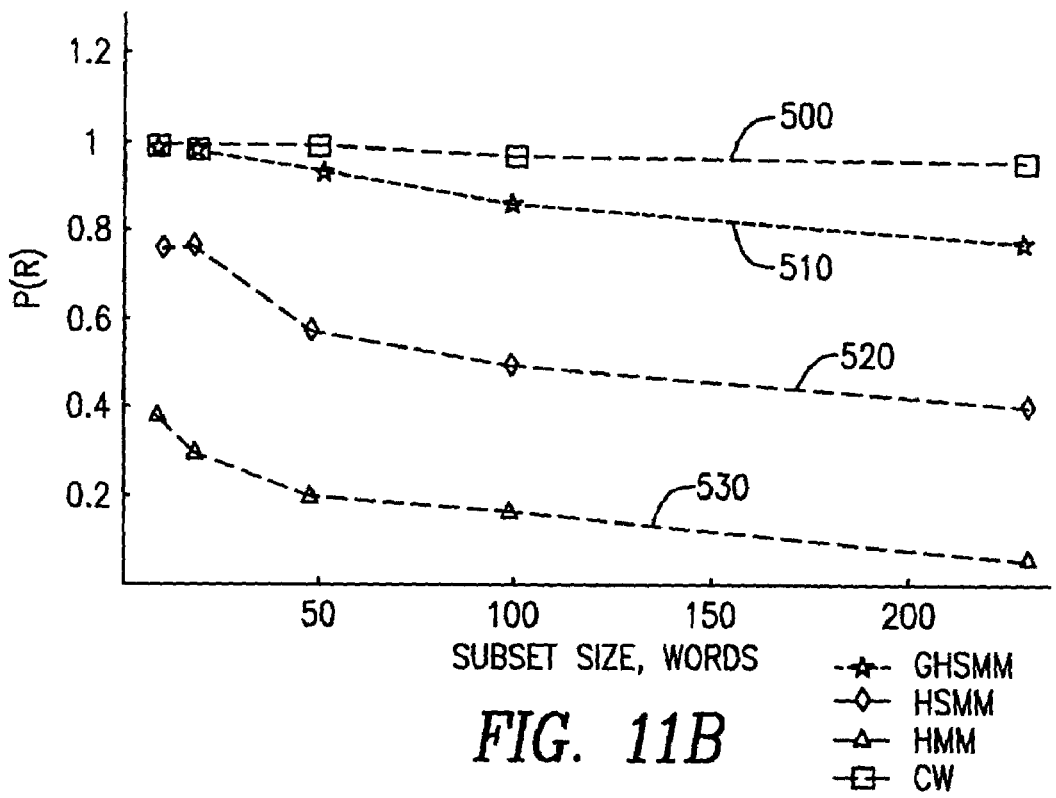
Figure 11C:
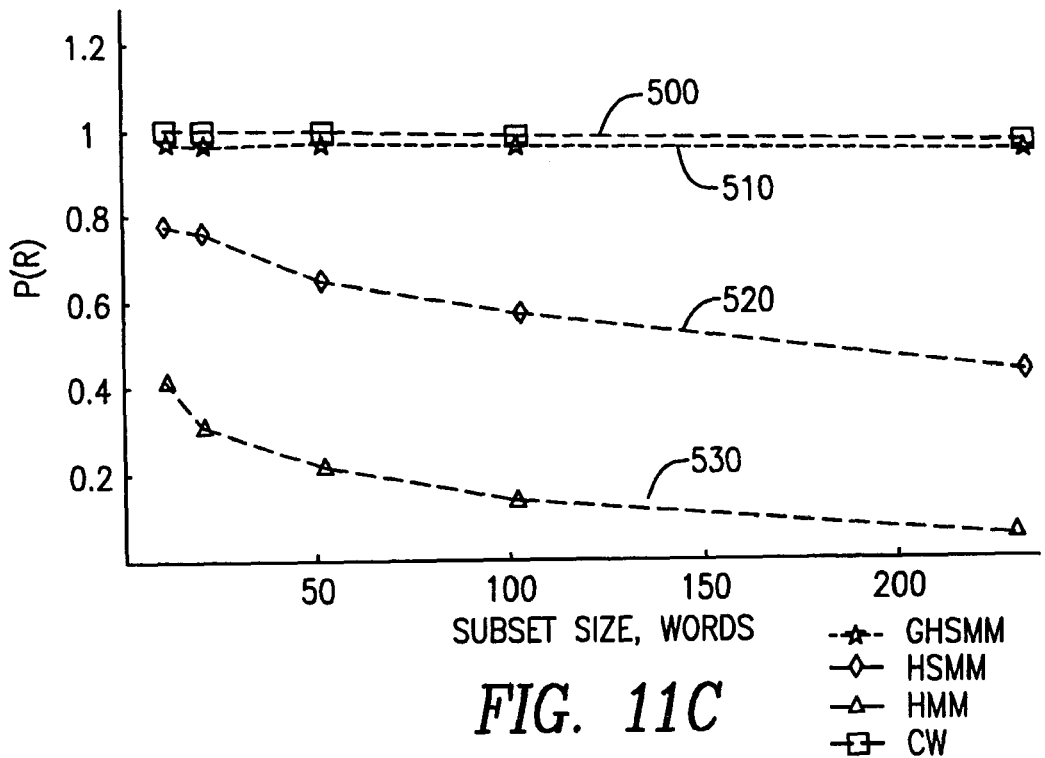
Figure 11D:
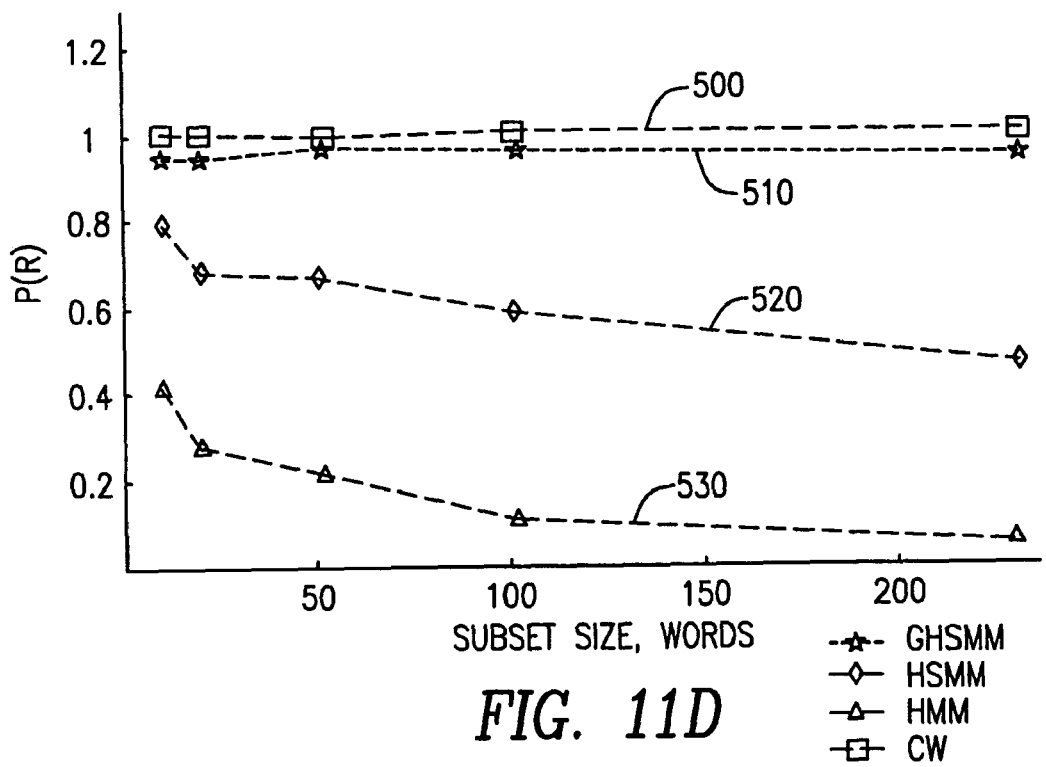
Figure 11E:
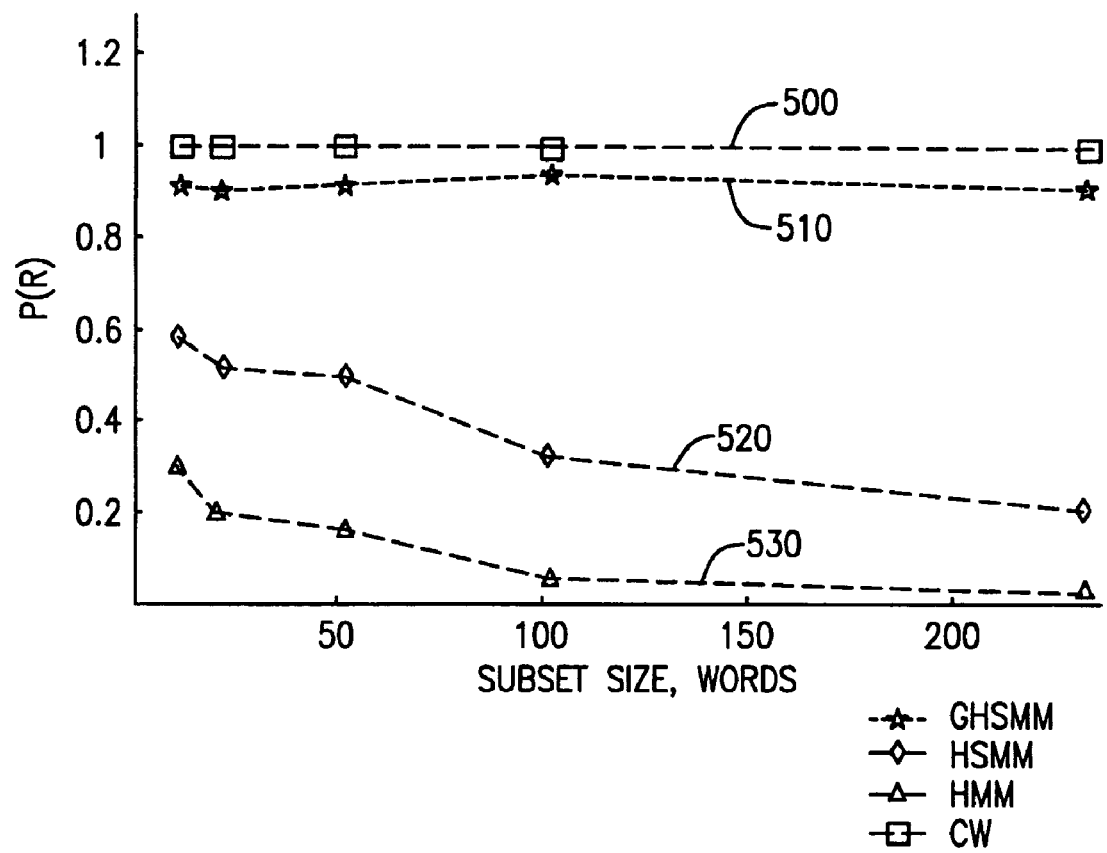

The reconstruction rates of FIGS. 11A–E show the close approximation of the GHSMM to the confidence windows of FIGS. 4A–E, respectively. As clearly illustrated by FIGS. 11A–E, the GHSMM (curve 510) is much superior in reconstruction rate P(R) and less susceptible to vocabulary size than either the HSMM (curve 520) used alone or the HMM (curve 530). FIG. 11A shows the reconstruction rate P(R) of the GSHMM 510, HSMM 520, and HMM 530 for a 3-pane confidence window 500 as shown in FIG. 4D versus increasing size subsets of vocabulary V. FIG. 11B shows the reconstruction rate P(R) of the GSHMM 510, HSMM 520, and HMM 530 for a 4-pane confidence window 500, with a transition pane to the left as shown in FIG. 4B versus increasing size subsets of vocabulary V. FIG. 11C shows the reconstruction rate P(R) of the GSHMM 510, HSMM 520, and HMM 530 for a 4-pane confidence window 500 with a transition pane to the right as shown in FIG. 4C versus increasing size subsets of vocabulary V. FIG. 11D shows the reconstruction rate P(R) of the GSHMM 510, HSMM 520, and HMM 530 for a 5-pane confidence window 500 as shown in FIG. 4A versus increasing size subsets of vocabulary V. FIG. 11E shows the reconstruction rate P(R) of the GSHMM 510, HSMM 520, and HMM 530 for a 6-pane confidence window 500 as shown in FIG. 4E versus increasing size subsets of vocabulary V.

The graphs of FIGS. 11A–11E illustrate how, except for the 4-pane, left transition window, application of the GHSMM to repair damaged communications made with any size vocabulary yields nearly the same result as the application of a confidence window. In the case of the 4-pane window noted, an increasing vocabulary size slowly decreases the effectiveness of the GHSMM. However, the effectiveness of HSMM and HMM model applications to the same vocabularies and damaged communication also fall off at about the same rate, so that the GHSMM is still significantly more effective overall.

As will be appreciated from the graphs of FIGS. 11A–11E, the application of the GHSMM model to the damaged symbol stream significantly improves over the use of the HSMM model alone and far outpaces the use of hidden Markov models. And, as the size of the confidence window modeled by the GHSMM increases, the accuracy of the GHSMM nearly approximates the confidence window technique exactly, excepting the model of the 4-pane window of FIG. 4B. Thus, the practical application of the GHSMM algorithm to the damaged symbol stream as an equivalent model of confidence windowing provides nearly the same accuracy, but in a small fraction of the time and effort that manual application of the confidence windows would require. Further, the GHSMM considers acoustic vectors, time orthography and spectral content of the speech signal, while confidence windowing does not consider any of these.

The GHSMM can be embodied on a computer, and processing damaged symbol streams by application of the algorithm does not test the limits of most computers used for this task. That is, the system of the invention created on a computer is neither memory nor processor intensive while achieving very high accuracy results. And, Baum-Welch Expectation Maximization type training is not needed to make the system work properly. Use of the GHSMM with its multiple time scale capability permits application of the system to any utterance length or complexity—from acoustic symbols to language symbols of varying sizes.

While specific embodiments of the invention have been shown and described in detail to illustrate the application of the principles of the invention, it will be understood that the invention may be embodied otherwise without departing from such principles.

What is claimed is:

1. A method for reconstructing a damaged stream of symbols using statistical behaviors of the symbol stream to replace damaged or missing symbols from the symbol stream with reconstructed symbols, the method comprising:
   inputting a stream of symbols into a symbol reconstruction system;
   pre-processing the input stream of symbols by extracting language parameters from the stream of symbols;
   generating a hidden semi-Markov model from the extracted language parameters;
   generating a generalized hidden semi-Markov model using the hidden semi-Markov model, the generalized hidden semi-Markov model capable of functioning on two different time scales;
   applying the generalized hidden semi-Markov model to the symbol stream to generate replacement characters for the damaged or missing symbols;
   post-processing the symbol stream by substituting replacement characters for the damaged or missing symbols to reconstruct the symbol stream; and
   outputting the reconstructed symbol stream from the symbol reconstruction system.

2. The method of claim 1, further comprising applying the generalized hidden semi-Markov model to the symbol stream to generate replacement characters.

3. The method of claim 1, wherein applying the generalized hidden semi-Markov model comprises applying a confidence window to the symbol stream to generate the replacement characters.

4. The method of claim 3, wherein pre-processing the input stream of symbols comprises selecting a confidence window and screening the input stream of symbols with the confidence window to extract language parameters.

5. The method of claim 4, wherein the extracted language parameters comprise observation probabilities, transition probabilities and duration of symbols.

6. The method of claim 1, wherein generating the generalized hidden semi-Markov model comprises grouping known symbols in the stream of symbols into a first set of states of the hidden semi-Markov model and grouping damaged or missing symbols in the stream of symbols into a second set of states of the hidden semi-Markov model.

7. The method of claim 6, wherein generating the generalized hidden semi-Markov model further comprises adding a transition probability non-commutative multiplication operator and an observation probability non-commutative multiplication operator to the hidden semi-Markov model.

8. The method of claim 7, wherein generating the generalized hidden semi-Markov model further comprises modifying a Viterbi Algorithm of the hidden semi-Markov model to choose symbols for reconstruction based on a maximization operation.

9. A method for reconstructing a damaged stream of symbols using statistical behaviors of a language of the symbol stream to replace damaged or missing symbols in the symbol stream with reconstructed symbols, the method comprising:
   inputting the stream with known and unknown symbols of the language into a symbol reconstruction system;

extracting language parameters from the known symbols;

generating a hidden semi-Markov model for the language from the extracted language parameters;

generating a generalized hidden semi-Markov model using the hidden semi-Markov model, the generalized hidden semi-Markov model capable of functioning on two different time scales;

generating replacement characters for the damaged or missing symbols by applying the generalized hidden semi-Markov model to the second stream of symbols;

post-processing the stream of symbols by substituting replacement characters for the unknown symbols to reconstruct the stream of symbols; and outputting the reconstructed stream of symbols from the symbol reconstruction system.

10. The method of claim 9, wherein applying the generalized hidden semi-Markov model comprises applying a confidence window to the stream of symbols to generate the replacement characters.

11. The method of claim 9, wherein the extracted language parameters comprise observation probabilities, transition probabilities and duration of symbols for the language.

12. The method of claim 9, wherein generating the replacement characters further comprises modifying a Viterbi Algorithm of the hidden semi-Markov model to choose symbols for reconstruction based on a maximization operation.

13. The method of claim 9, wherein generating the replacement characters comprises grouping known symbols in the stream of symbols into a first set of states of the hidden semi-Markov model and grouping unknown symbols in the stream of symbols into a second set of states of the hidden semi-Markov model.

14. The method of claim 13, wherein generating the replacement characters further comprises adding a transition probability non-commutative multiplication operator and an observation probability non-commutative multiplication operator to the hidden semi-Markov model.

15. A method for reconstructing a damaged stream of symbols using statistical behaviors of a language of the symbol stream and statistical relationships of known symbols to damaged or missing symbols to replace the damaged or missing symbols in the symbol stream with reconstructed symbols, the method comprising:

identifying unknown symbols;

assessing first transition probabilities between first symbols of the symbol stream, the first symbols sized dependent on a first regeneration time parameter;

assessing second transition probabilities between second symbols in the symbol stream, the second symbols sized dependent on a second regeneration time parameter;

generating a generalized hidden semi-Markov model from the symbol stream and first and second transition probabilities;

generating a second, generalized output symbol stream during a first Viterbi algorithm application;

using said second output symbol stream in a Markov Random Field on a GHSMM trellis; and interleaving a probability of the Random Markov Field in a second Viterbi algorithm application.

* * * * *